(12) United States Patent
Pushkaran et al.

(10) Patent No.: US 9,739,201 B2
(45) Date of Patent: Aug. 22, 2017

(54) WAKE REDUCING STRUCTURE FOR A TURBINE SYSTEM AND METHOD OF REDUCING WAKE

(71) Applicant: General Electric Company, Schenectady, NY (US)

(72) Inventors: Chandrasekhar Pushkaran, Karnataka (IN); Nishant Govindbhai Parsania, Karnataka (IN); Arjun Singh, Karnataka (IN)

(73) Assignee: General Electric Company, Schenectady, NY (US)

( * ) Notice: Subject to any disclaimer, the term of this patent is extended or adjusted under 35 U.S.C. 154(b) by 883 days.

(21) Appl. No.: 13/889,747

(22) Filed: May 8, 2013

(65) Prior Publication Data
US 2014/0331674 A1 Nov. 13, 2014

(51) Int. Cl.
*F02C 7/22* (2006.01)
*F23R 3/00* (2006.01)
(Continued)

(52) U.S. Cl.
CPC ............... *F02C 7/22* (2013.01); *F23R 3/005* (2013.01); *F23R 3/06* (2013.01); *F23R 3/16* (2013.01);
(Continued)

(58) Field of Classification Search
CPC ............ F01D 9/023; F23R 2900/03044; F23R 3/002; F23R 3/06; F23R 2900/03043; F23M 5/085
See application file for complete search history.

(56) References Cited

U.S. PATENT DOCUMENTS 2,988,878 A * 6/1961 Hopper ................... F23R 3/28
239/556
3,643,426 A 2/1972 Janelid
(Continued)

FOREIGN PATENT DOCUMENTS

EP 1130321 A1 9/2001
EP 1482246 A1 12/2004
(Continued)

OTHER PUBLICATIONS

Extended European Search Report for EP Application No. 12190915.4-1602, dated Feb. 11, 2013, pp. 1-8.
(Continued)

*Primary Examiner* — Phutthiwat Wongwian
*Assistant Examiner* — Stefan Ibroni
(74) *Attorney, Agent, or Firm* — Ernest G. Cusick; Frank A. Landgraff

(57) ABSTRACT

A wake reducing structure for a turbine system includes a combustor liner having an inner surface and an outer surface, the inner surface defining a combustor chamber. Also included is an airflow path located along the outer surface of the combustor liner. Further included is a wake generating component disposed in the airflow path and proximate the combustor liner, wherein the wake generating component generates a wake region located downstream of the wake generating component. Yet further included is an airfoil at least partially disposed in the wake region, the airfoil comprising at least one airfoil hole.

19 Claims, 6 Drawing Sheets

(51) Int. Cl.
*F23R 3/06* (2006.01)
*F23R 3/16* (2006.01)
*F23R 3/34* (2006.01)

(52) U.S. Cl.
CPC .... *F23R 3/346* (2013.01); *F23R 2900/00017* (2013.01); *F23R 2900/00018* (2013.01); *F23R 2900/03043* (2013.01); *Y10T 29/49229* (2015.01)

(56) References Cited

U.S. PATENT DOCUMENTS

| | | | |
|---|---|---|---|
| 3,734,639 A | | 5/1973 | Short |
| 4,259,842 A | | 4/1981 | Koshoffer et al. |
| 4,693,667 A | * | 9/1987 | Lenz ............... F01D 5/189 |
| | | | 415/115 |
| 4,786,016 A | | 11/1988 | Presz et al. |
| 4,802,821 A | | 2/1989 | Krietmeier |
| 4,844,689 A | | 7/1989 | Seed |
| 4,896,510 A | | 1/1990 | Foltz |
| 5,226,278 A | | 7/1993 | Meylan et al. |
| 5,274,991 A | | 1/1994 | Fitts |
| 5,394,688 A | * | 3/1995 | Amos ............... F23C 7/006 |
| | | | 60/39.23 |
| 5,406,786 A | | 4/1995 | Scharpf et al. |
| 5,486,091 A | | 1/1996 | Sharma |
| 5,749,218 A | | 5/1998 | Cromer et al. |
| 5,785,498 A | | 7/1998 | Quinn et al. |
| 5,813,828 A | | 9/1998 | Norris |
| 6,174,129 B1 | | 1/2001 | Mazzola et al. |
| 6,206,638 B1 | * | 3/2001 | Glynn ............... F01D 5/186 |
| | | | 415/115 |
| 6,209,325 B1 | | 4/2001 | Alkabie |
| 6,345,493 B1 | | 2/2002 | Smith et al. |
| 6,402,458 B1 | | 6/2002 | Turner |
| 6,409,126 B1 | | 6/2002 | Cunningham, Jr. |
| 6,435,814 B1 | | 8/2002 | Yu et al. |
| 6,438,961 B2 | | 8/2002 | Tuthill et al. |
| 6,442,941 B1 | | 9/2002 | Anand et al. |
| 6,484,505 B1 | | 11/2002 | Brown et al. |
| 6,527,503 B2 | | 3/2003 | Spano et al. |
| 6,543,234 B2 | | 4/2003 | Anand et al. |
| 6,554,562 B2 | | 4/2003 | Dudebout et al. |
| 6,584,779 B2 | | 7/2003 | Priestley |
| 6,598,398 B2 | | 7/2003 | Viteri et al. |
| 6,602,458 B1 | | 8/2003 | Skov |
| 6,626,635 B1 | | 9/2003 | Prowse |
| 6,824,710 B2 | | 11/2004 | Viteri et al. |
| 6,868,676 B1 | * | 3/2005 | Haynes ............... F02C 3/14 |
| | | | 60/740 |
| 6,899,081 B2 | | 5/2005 | Bielicki et al. |
| 6,910,335 B2 | | 6/2005 | Viteri et al. |
| 6,935,116 B2 | | 8/2005 | Stuttaford et al. |
| 6,958,383 B2 | | 10/2005 | Desmazeau et al. |
| D511,377 S | | 11/2005 | Erwan et al. |
| 7,007,478 B2 | | 3/2006 | Dinu |
| 7,089,742 B2 | | 8/2006 | Spooner et al. |
| 7,340,129 B2 | | 3/2008 | Yalin et al. |
| 7,373,773 B2 | | 5/2008 | Noda |
| 7,410,343 B2 | | 8/2008 | Wakazono et al. |
| 7,412,129 B2 | | 8/2008 | Yalin et al. |
| 7,420,662 B2 | | 9/2008 | Yalin et al. |
| 7,574,865 B2 | | 8/2009 | Bland |
| 7,654,320 B2 | | 2/2010 | Payton |
| 7,762,074 B2 | | 7/2010 | Bland et al. |
| 7,805,946 B2 | | 10/2010 | Ohri et al. |
| 7,896,645 B2 | | 3/2011 | Loving |
| 8,234,872 B2 | | 8/2012 | Berry et al. |
| 8,307,657 B2 | | 11/2012 | Chila |
| 8,516,822 B2 | | 8/2013 | Chen et al. |
| 8,707,672 B2 | | 4/2014 | Zuo et al. |
| 2002/0124572 A1 | * | 9/2002 | Pidcock ............... F23R 3/002 |
| | | | 60/796 |
| 2003/0136102 A1 | | 7/2003 | Nottin |
| 2005/0172607 A1 | | 8/2005 | Ishizaka et al. |
| 2005/0206196 A1 | | 9/2005 | Ortega et al. |
| 2006/0101801 A1 | | 5/2006 | Bland |
| 2006/0283189 A1 | | 12/2006 | Lipinski et al. |
| 2007/0130958 A1 | | 6/2007 | Ohri et al. |
| 2007/0251240 A1 | | 11/2007 | Johnson et al. |
| 2009/0155062 A1 | | 6/2009 | Guimbard et al. |
| 2009/0223228 A1 | | 9/2009 | Romoser |
| 2009/0320484 A1 | | 12/2009 | Lacy et al. |
| 2010/0054929 A1 | | 3/2010 | Ning et al. |
| 2010/0111684 A1 | | 5/2010 | Ning et al. |
| 2010/0122538 A1 | | 5/2010 | Ning et al. |
| 2010/0287943 A1 | | 11/2010 | McMahan et al. |
| 2010/0326082 A1 | | 12/2010 | Ziminsky et al. |
| 2011/0107766 A1 | | 5/2011 | Davis, Jr. et al. |
| 2011/0197586 A1 | | 8/2011 | Berry et al. |
| 2011/0214429 A1 | | 9/2011 | Chen et al. |
| 2012/0085100 A1 | | 4/2012 | Hughes et al. |
| 2012/0159954 A1 | | 6/2012 | Ito et al. |
| 2012/0167544 A1 | * | 7/2012 | Toronto ............... F23R 3/16 |
| | | | 60/39.52 |
| 2012/0167586 A1 | | 7/2012 | Bailey et al. |
| 2012/0186255 A1 | | 7/2012 | Parsania et al. |
| 2012/0247118 A1 | | 10/2012 | Antoniono et al. |
| 2012/0297783 A1 | * | 11/2012 | Melton ............... F23R 3/002 |
| | | | 60/772 |
| 2012/0297784 A1 | * | 11/2012 | Melton ............... F23R 3/002 |
| | | | 60/772 |
| 2012/0297785 A1 | | 11/2012 | Melton et al. |
| 2013/0115566 A1 | | 5/2013 | Khan et al. |
| 2014/0041357 A1 | | 2/2014 | Malandra et al. |

FOREIGN PATENT DOCUMENTS

EP 2154431 A2 2/2010
JP 54114619 A 9/1979

OTHER PUBLICATIONS

Extended European Search Report for EP Application No. 12190923.8-1602, dated Feb. 13, 2013, pp. 1-7.

* cited by examiner

WAKE REDUCING STRUCTURE FOR A TURBINE SYSTEM AND METHOD OF REDUCING WAKE

BACKGROUND OF THE INVENTION

The subject matter disclosed herein relates to turbine systems, and more particularly to a wake reducing structure for such turbine systems, as well as a method of reducing wake.

Combustor arrangements are often of a reverse-flow configuration and include a liner formed of sheet metal. The sheet metal and an outer boundary component form a path for air received from the compressor outlet to flow in a direction toward a head end of the combustor, where the air is then turned into nozzles and mixed with fuel in a combustor chamber. Various components that serve structural and functional benefits may be located along the airflow path. These components result in wake regions located proximate a downstream side of the components. These wake regions lead to pressure drops and non-uniform airflow as the air is provided to the nozzles at the head end, thereby leading to undesirable effects such as increased NOx emission and less efficient overall operation.

BRIEF DESCRIPTION OF THE INVENTION

According to one aspect of the invention, a wake reducing structure for a turbine system includes a combustor liner having an inner surface and an outer surface, the inner surface defining a combustor chamber. Also included is an airflow path located along the outer surface of the combustor liner. Further included is a wake generating component disposed in the airflow path and proximate the combustor liner, wherein the wake generating component generates a wake region located downstream of the wake generating component. Yet further included is an airfoil at least partially disposed in the wake region, the airfoil comprising at least one airfoil hole.

According to another aspect of the invention, a wake reducing structure for a turbine system includes a combustor liner having an inner surface and an outer surface, the inner surface defining a combustor chamber. Also included is an airflow path located along the outer surface of the combustor liner. Further included is a wake generating component disposed in the airflow path and proximate the combustor liner, wherein the wake generating component generates a wake region located downstream of the wake generating component. Yet further included is at least one suction hole extending through the combustor liner and disposed in the wake region.

According to yet another aspect of the invention, a method of reducing a wake region in a turbine system is provided. The method includes flowing air along an airflow path located along an outer surface of a combustor liner. The method also includes drawing air into a wake region generated by a wake generating component disposed in the airflow path and proximate the combustor liner, wherein the air is drawn into the wake region with at least one airfoil hole of an airfoil disposed within the wake region.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
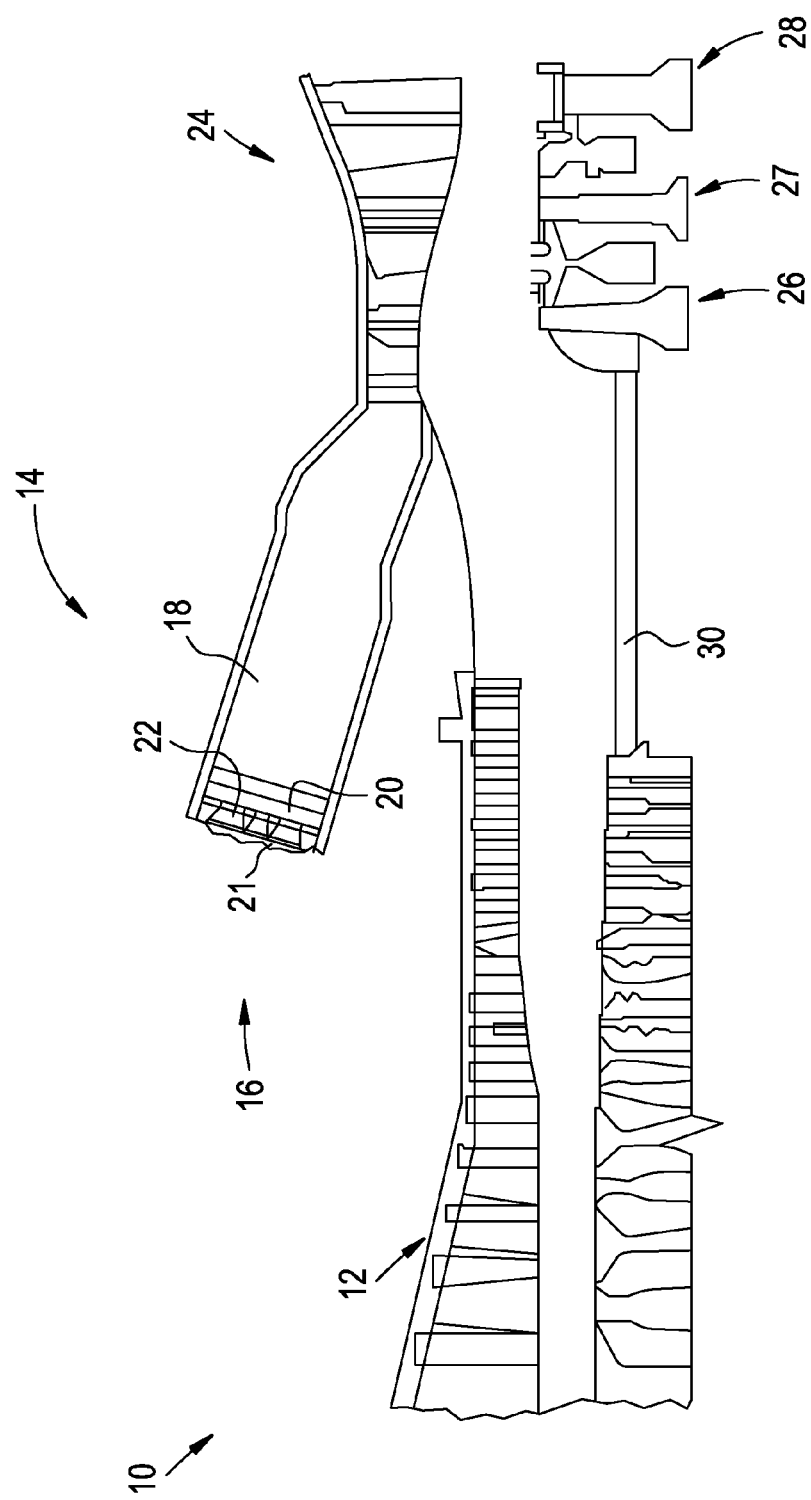
FIG. 1 is a schematic illustration of a turbine system.

Referring to FIG. 1, a turbine system, such as a gas turbine engine 10, constructed in accordance with an exemplary embodiment of the present invention is schematically illustrated. The gas turbine engine 10 includes a compressor 12 and a plurality of combustor assemblies arranged in a can annular array, one of which is indicated at 14. As shown, the combustor assembly 14 includes an endcover assembly 16 that seals, and at least partially defines, a combustor chamber 18. A plurality of nozzles 20-22 are supported by the endcover assembly 16 and extend into the combustor chamber 18. The nozzles 20-22 receive fuel through a common fuel inlet (not shown) and compressed air from the compressor 12. The fuel and compressed air are passed into the combustor chamber 18 and ignited to form a high temperature, high pressure combustion product or air stream that is used to drive a turbine 24. The turbine 24 includes a plurality of stages 26-28 that are operationally connected to the compressor 12 through a compressor/turbine shaft 30 (also referred to as a rotor).

In operation, air flows into the compressor 12 and is compressed into a high pressure gas. The high pressure gas is supplied to the combustor assembly 14 and mixed with fuel, for example natural gas, fuel oil, process gas and/or synthetic gas (syngas), in the combustor chamber 18. The fuel/air or combustible mixture ignites to form a high pressure, high temperature combustion gas stream. In any event, the combustor assembly 14 channels the combustion gas stream to the turbine 24 which converts thermal energy to mechanical, rotational energy.

Figure 2:
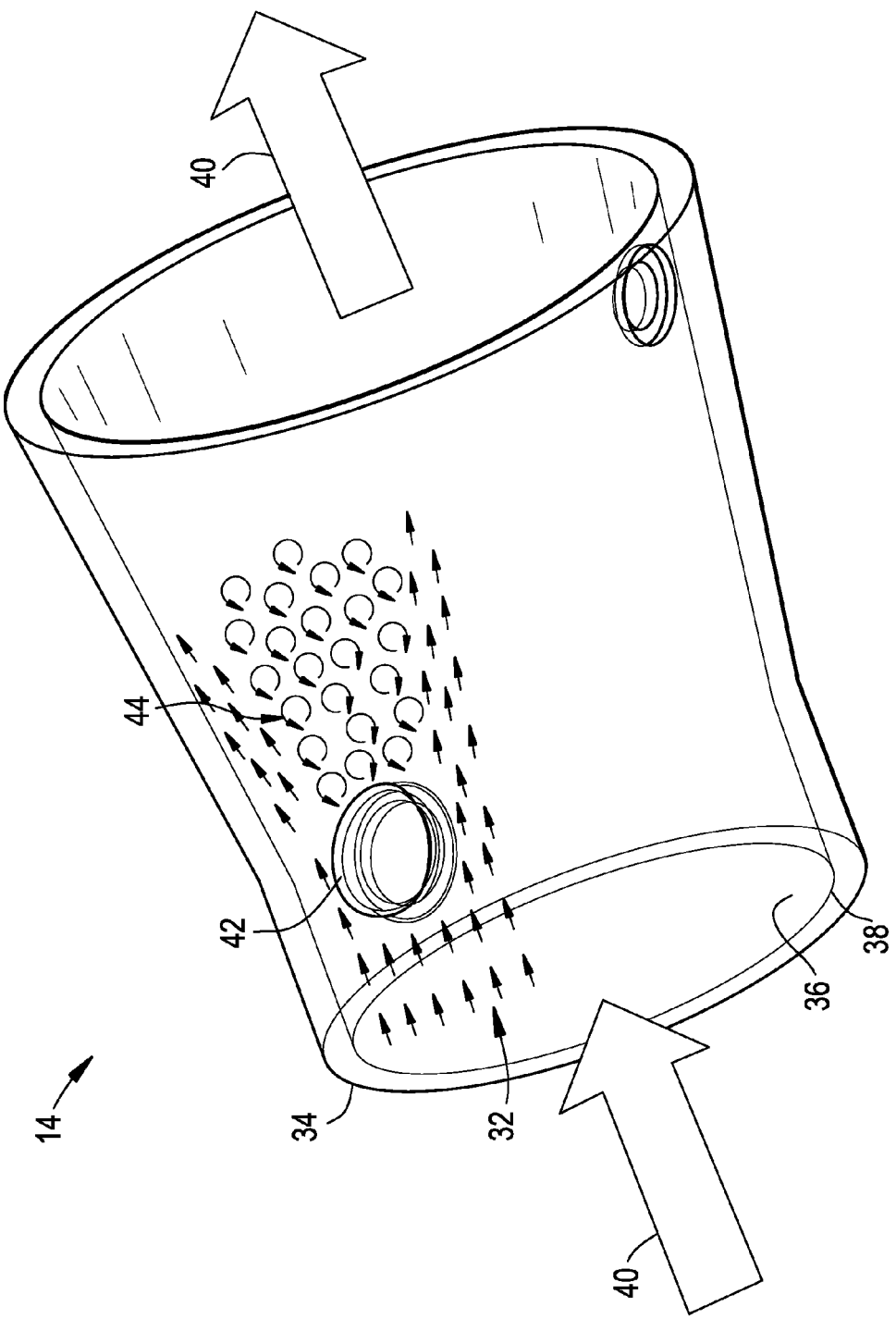
FIG. 2 is a perspective view of a portion of a combustor liner of the turbine system.

Referring now to FIG. 2, a portion of the combustor assembly 14 is illustrated. As noted above, the combustor assembly 14 is typically one of several combustors operating within the gas turbine engine 10, which are often circumferentially arranged. The combustor assembly 14 is often tubular in geometry and directs the hot pressurized gas into the turbine section 24 of the gas turbine engine 10.

The combustor assembly 14 is defined by a combustor liner 32 which is at least partially surrounded at a radially outward location by an outer boundary component 34, such as a flow sleeve, for example. Specifically, the combustor liner 32 includes an inner surface 36 and an outer surface 38, where the inner surface 36 defines the combustor chamber 18. An airflow path 40 formed between the outer surface 38 of the combustor liner 32 and the outer boundary component 34 provides a region for an airstream to flow therein toward nozzles of the combustor assembly 14. Although illustrated and previously described as having the flow sleeve surrounding the combustor liner 32, it is contemplated that only the combustor liner 32 is present, with the outer boundary component 34 comprising an outer casing or the like. Disposed within, or partially protruding into, the airflow path 40 is at least one wake generating component 42. The wake generating component 42 generically refers to any structural member and may provide various structural and/or functional benefits to the gas turbine engine 10. For example, the wake generating component 42 comprises a fuel injector extending radially inwardly through the combustor liner 32, a tube such as a cross-fire tube that fluidly couples adjacent combustor chambers, or cameras, etc. The preceding list is merely exemplary and it is to be understood that the wake generating component 42 may refer to any structural member disposed in the airflow path 40.

As air flowing within the airflow path 40 encounters the wake generating component 42, a wake region 44 is generated downstream of the wake generating component 42. Specifically, the wake region 44 may extend from immediately adjacent a downstream end of the wake generating component 42 to locations proximate the downstream end of the wake generating component 42. Various embodiments described herein reduce the wake region 44 by imposing a suction effect on a mass of air around the wake generating component 42 to fill in the wake region 44.

Figure 3:
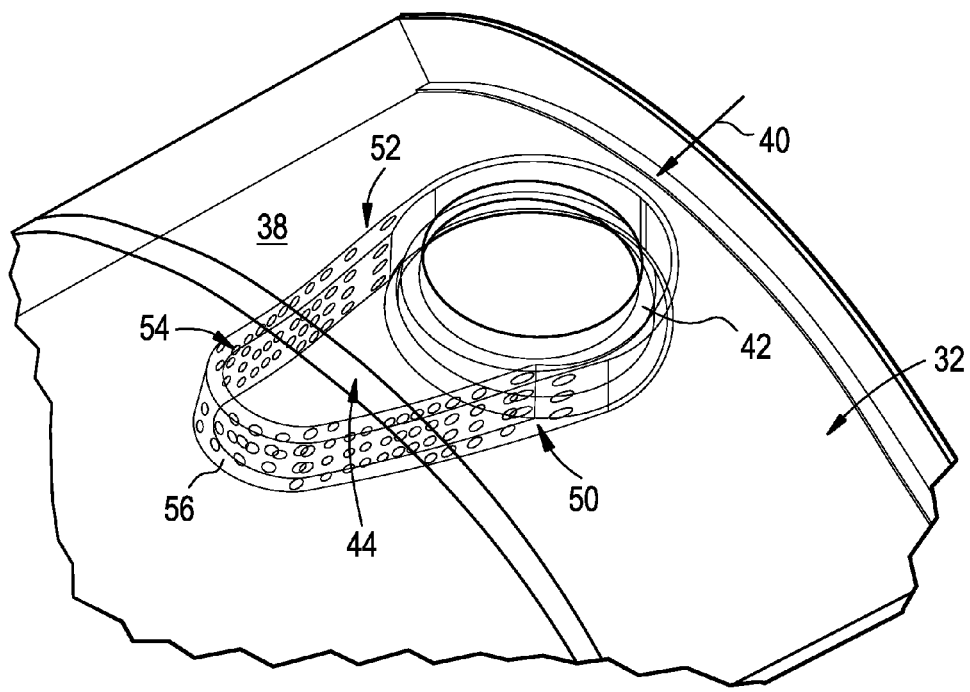
FIG. 3 is a perspective view of a wake reducing structure according to a first embodiment.

Referring to FIG. 3, a wake reducing structure 50 according to a first embodiment is illustrated and the wake generating component 42 is illustrated in greater detail. As air flows around the wake generating component 42, air separation and wake results, as described in detail above. To provide a suction effect on the air, an airfoil 52 is disposed in close proximity with the wake generating component 42 and in one embodiment is operatively coupled to the wake generating component 42. The operative coupling of the airfoil 52 may be done in various manufacturing and/or assembly processes, including welding or molding, for example. The airfoil 52 is disposed, at least partially, in the wake region 44 and includes at least one, but typically a plurality of airfoil holes 54 extending through an airfoil sidewall 56. The plurality of airfoil holes 54 draws in air to reduce the wake region 44 and promote overall airflow uniformity throughout the airflow path 40.

Figure 4:
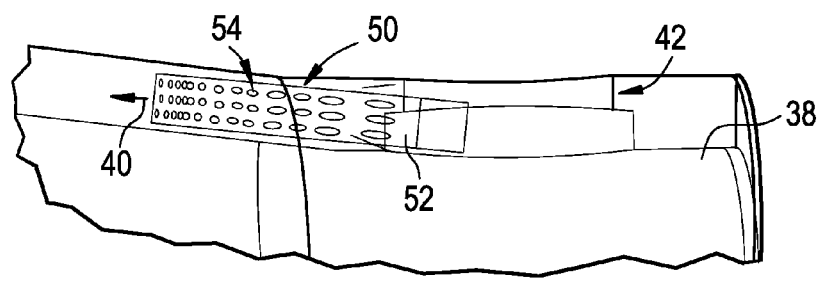
FIG. 4 is an elevational, side view of the wake reducing structure of FIG. 3 according to another aspect of the invention.

As shown in FIG. 4, the plurality of airfoil holes 54 may be arranged in various patterns, such as the illustrated varying inlet profile. The varying inlet profile refers to an arrangement of the plurality of airfoil holes 54 that vary in size and/or spacing, as well as density. In the illustrated embodiment, the density of holes increases at the downstream end of the airfoil 52.

Figure 5:
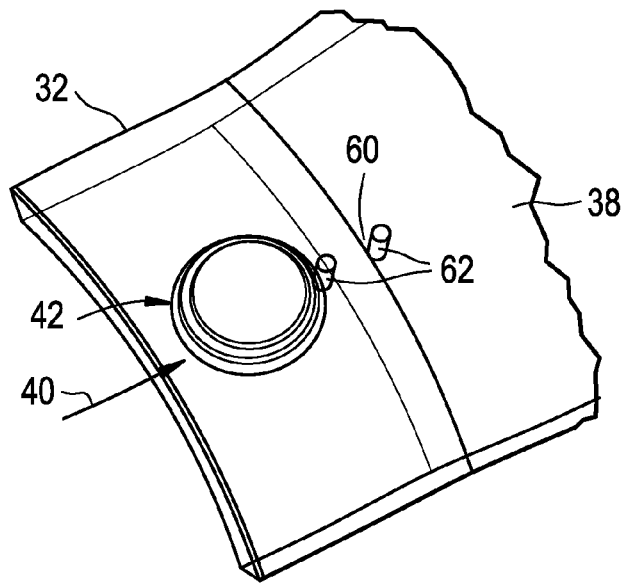
FIG. 5 is a perspective view of the wake reducing structure according to a second embodiment.
Figure 6:
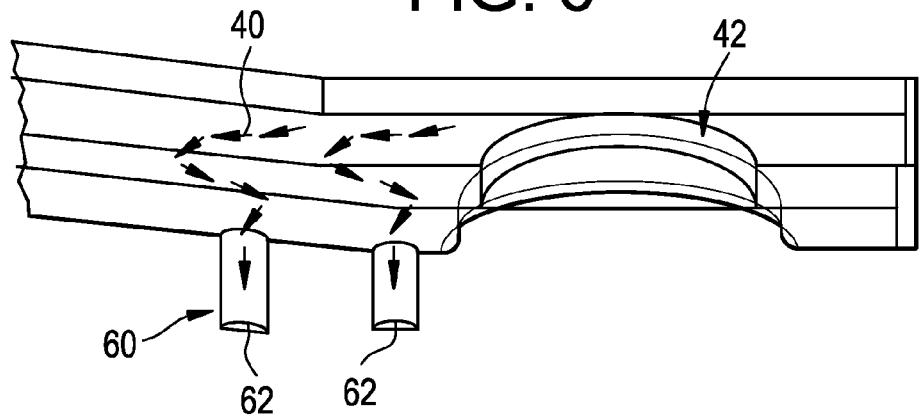
FIG. 6 is an elevational, side view of the wake reducing structure of FIG. 5.

Referring now to FIGS. 5 and 6, a wake reducing structure 60 according to a second embodiment is illustrated. The wake reducing structure 60 includes at least one suction hole 62, but as illustrated a plurality of suction holes may be included. The at least one suction hole 62 is located proximate the wake region 44 and is defined by, and extends through, the combustor liner 32. Specifically, the at least one suction hole 62 extends from the inner surface 36 to the outer surface 38 of the combustor liner 32, thereby fluidly coupling the airflow path 40 and the combustor chamber 18. Suction of the airflow into the wake region 44 is achieved due to the lower pressure of the combustor chamber 18 relative to the airflow path 40. As the air is drawn to the lower pressure combustor chamber 18 through the at least one suction hole 62, the pulled air "fills-in" the wake region 44, thereby reducing undesirable effects associated with large wake regions.

Figure 7:
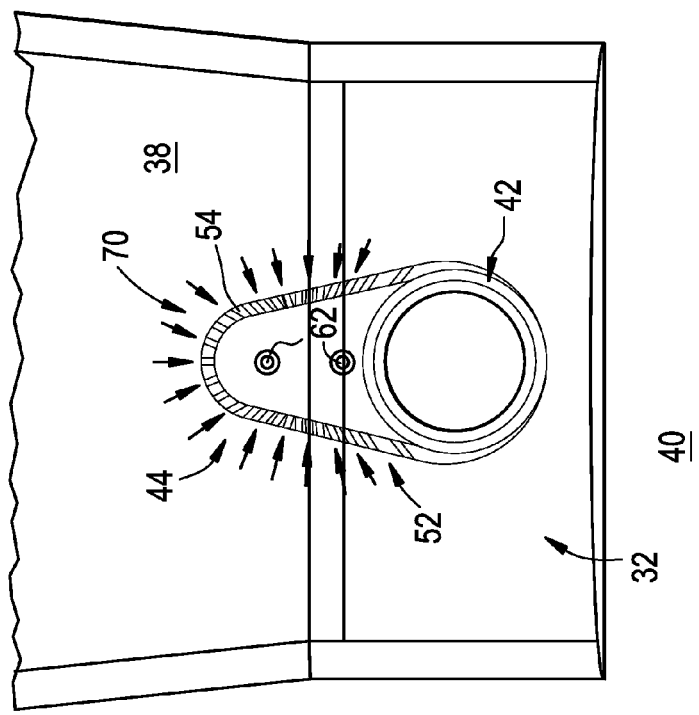
FIG. 7 is a perspective view of the wake reducing structure according to a third embodiment.
Figure 8:
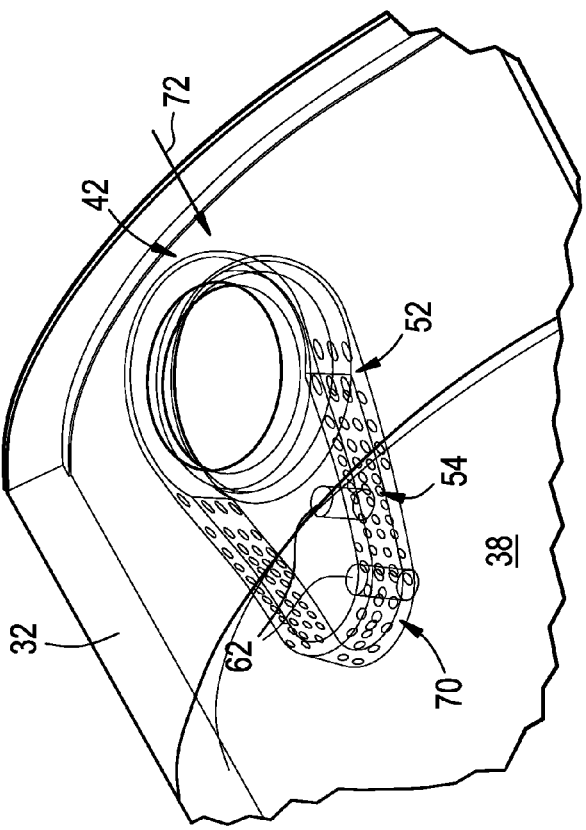
FIG. 8 is a plan view of the wake reducing structure of FIG. 7.

Referring now to FIGS. 7 and 8, a wake reducing structure 70 according to a third embodiment is illustrated. The wake reducing structure 70 incorporates aspects of the embodiments described above. In particular, included are the at least one suction hole 62 extending through the combustor liner 32 and the airfoil 52 having a plurality of airfoil holes 54. This embodiment combines the benefits associated with the above-described embodiments. Specifically, the incoming airflow 72 is pulled into the wake region 44 due to the plurality of airfoil holes 54 and the at least one suction hole 62. The wake reducing structure 70 provides increased suction and wake reduction for regions that would otherwise experience significant wake.

Advantageously, airflow uniformity is increased as the airflow is routed to the head end nozzles, which promotes increased overall efficiency of the gas turbine engine 10, as well as reduced NOx emission.

Figure 9:
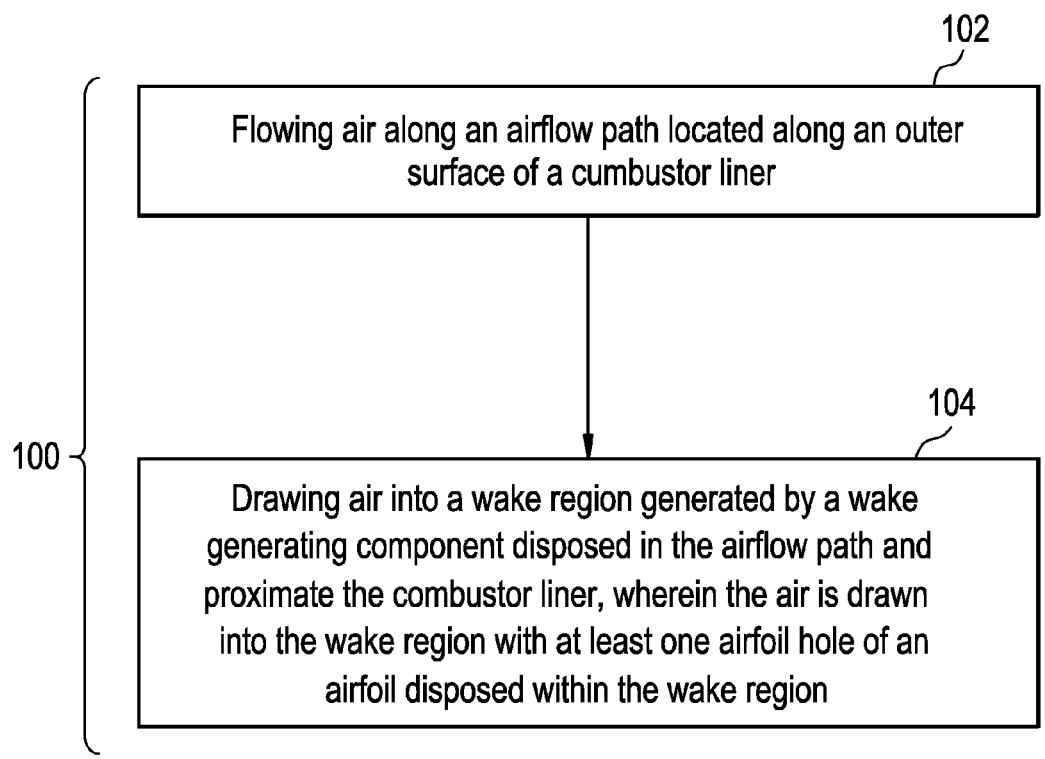
FIG. 9 is a flow diagram illustrating a method of reducing wake in the turbine system.

As illustrated in the flow diagram of FIG. 9, and with reference to FIGS. 1-8, a method of reducing a wake region in a turbine system 100 is also provided. The gas turbine engine 10, as well as the various embodiments of the wake reducing structure 50, 60 and 70, has been previously described and specific structural components need not be described in further detail. The method of reducing a wake region in a turbine system 100 includes flowing air along an airflow path located along an outer surface of a combustor liner 102. The method also includes drawing air into a wake region generated by a wake generating component disposed in the airflow path and proximate the combustor liner, wherein the air is drawn into the wake region with at least one airfoil hole of an airfoil disposed within the wake region 104.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A wake reducing structure for a turbine system comprising:
   a combustor liner having an inner surface and an outer surface, the inner surface defining a combustor chamber;
   a sleeve at least partially surrounding the liner;
   an airflow path located along the outer surface of the combustor liner;
   a wake generating component disposed in the airflow path and proximate the combustor liner, wherein the wake generating component generates a wake region located downstream of the wake generating component; and an airfoil at least partially disposed in the wake region, the airfoil comprising a sidewall and at least one airfoil hole, the at least one airfoil hole extending through the side wall to draw air in through the at least one airfoil hole into the wake region to reduce wake in the wake region, a gap between the sleeve and an outer surface of the side wall.

2. The wake reducing structure of claim 1, wherein the at least one airfoil hole comprises a plurality of airfoil holes.

3. The wake reducing structure of claim 2, wherein the plurality of airfoil holes is arranged as a varying inlet profile comprising holes of varying size and spacing.

4. The wake reducing structure of claim 1, further comprising at least one suction hole extending through the combustor liner and disposed in the wake region.

5. The wake reducing structure of claim 1, wherein the airfoil is operatively coupled to the wake generating component.

6. The wake reducing structure of claim 5, wherein the airfoil is welded to the wake generating component.

7. The wake reducing structure of claim 5, wherein the airfoil is a molded-in feature of the wake generating component.

8. The wake reducing structure of claim 1, wherein the wake generating component comprises a tube.

9. The wake reducing structure of claim 1, wherein the wake generating component comprises a fuel injector.

10. The wake reducing structure of claim 1, wherein the at least one airfoil hole extends through the airfoil sidewall and is configured to redirect air toward at least one suction hole extending through the combustor liner and disposed in the wake region.

11. A wake reducing structure for a turbine system comprising:
   a combustor liner having an inner surface and an outer surface, the inner surface defining a combustor chamber;
   an airflow path located along the outer surface of the combustor liner;
   a wake generating component disposed in the airflow path and proximate the combustor liner, wherein the wake generating component generates a wake region located downstream of the wake generating component; and
   an airfoil at least partially disposed in the wake region, the airfoil comprising a sidewall and at least one airfoil hole, the at least one airfoil hole extending through the side wall to draw air in through the at least one airfoil hole into the wake region to reduce wake in the wake region, wherein the at least one airfoil hole is configured to redirect air toward at least one suction hole extending through the combustor liner and disposed in the wake region.

12. The wake reducing structure of claim 11, wherein the at least one airfoil hole comprises a plurality of airfoil holes.

13. The wake reducing structure of claim 12, wherein the plurality of airfoil holes is arranged as a varying inlet profile comprising holes of varying size and spacing.

14. The wake reducing structure of claim 11, further comprising at least one suction hole extending through the combustor liner and disposed in the wake region.

15. The wake reducing structure of claim 11, wherein the airfoil is operatively coupled to the wake generating component.

16. The wake reducing structure of claim 15, wherein the airfoil is welded to the wake generating component.

17. The wake reducing structure of claim 15, wherein the airfoil is a molded-in feature of the wake generating component.

18. The wake reducing structure of claim 11, wherein the wake generating component comprises a tube.

19. The wake reducing structure of claim 11, wherein the wake generating component comprises a fuel injector.

* * * * *